Patented Feb. 20, 1951

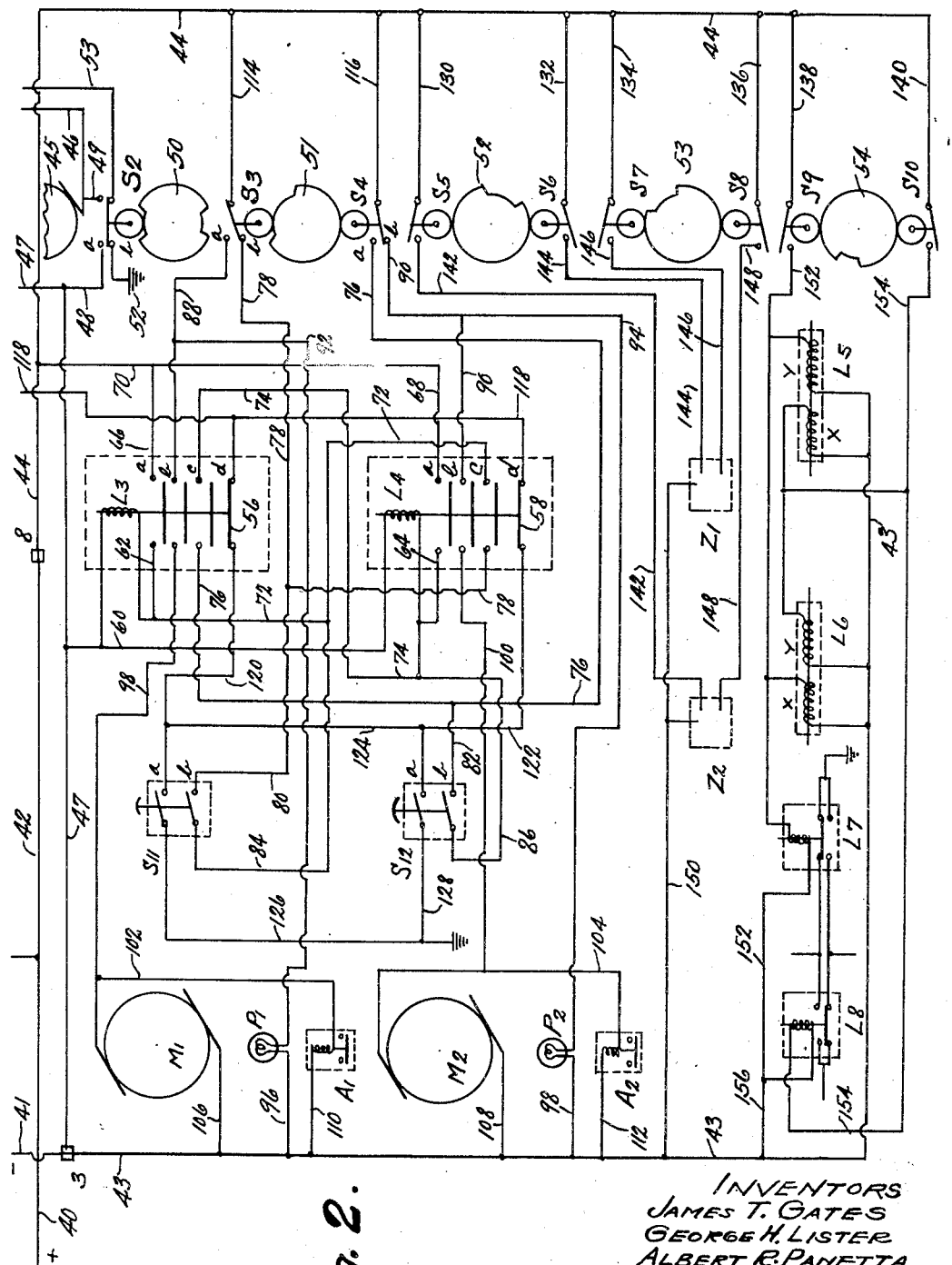

2,542,189

UNITED STATES PATENT OFFICE 2,542,189

SEQUENTIAL MOTOR OPERATION

James T. Gates and George H. Lister, Cleveland, Ohio, and Albert R. Panetta, Malden, Mass., assignors, by mesne assignments, to Machine Circuit Control Co., Cleveland, Ohio Application October 4, 1949, Serial No. 119,472

5 Claims. (Cl. 318—102)

1

The invention disclosed herein relates to the control of sequential motor operation of two motor sets that are designed to be started and run for a period of time with the performance of associated mechanisms. As an example of such an installation, the invention is adapted to the successive operation of movie projector machines that involve the timed operation of shutters, dousers, sound transposing means, and light sources, etc., incident to the reproduction of pictures and sound from traveling strips driven by either one of the projector machines somewhat as accomplished by the invention claimed in a copending application filed by James T. Gates on May 27, 1948, as Ser. No. 29,472. At the concluding run of either machine, devices are set into operation that start the operation of the companion machine, the switchover being instituted by a specific frequency signal incorporated in the sound track of the traveling strip, in conjunction with means and mechanism that responds to the specific frequency for starting and running of a cycling motor and switches that effects the timed operation of the projector motor and its associated devices. The frequency responding means and mechanism for initiating the operation of the cycling motor includes electronic circuits that control the level of the signal effected by the specific frequency and pass it through a low pass filter to exclude all frequencies above 45 cycles, which are amplified and limited in the nature of a sorting device that feeds a frequency selecting network. Isolating the filter network from the following relay tubes and permitting the 45 cycle signal to be amplified for first relay operation, which conjoins with a time delay means to fire the terminating tube initiates start of a switching motor. The switching motor drives cams for operating switches, which in conjunction with conditioning and selector switches control the successive operation of the two motor devices.

Embodiment of the invention according to the foregoing accomplishes the object to pick out a particular frequency from a mixture of sound signals, and use it for selective operation of a control circuit after filtering, limiting and amplifying, rejecting all but the selected signal frequency, and isolating and further amplifying for relay operation. The electronic initiating network therefore discriminates the actuating impulse, selected as a 45 cycle per second frequency because of its relatively infrequent occurrence of instrument tone differences or overtones.

Further objects and advantages of the present invention will be apparent from the following description, reference being had to the accompanying drawings wherein a preferred embodiment of the present invention is clearly shown.

In the drawings:

Fig. 2 is a circuit diagram of a motor control circuit adapted to effect the sequential operation of duplicate sets of interconnected devices whose timed operation is critical to the successful performance of the apparatus, a portion of this figure being a repetition of part of the circuit shown in Fig. 1.

Figure 1:
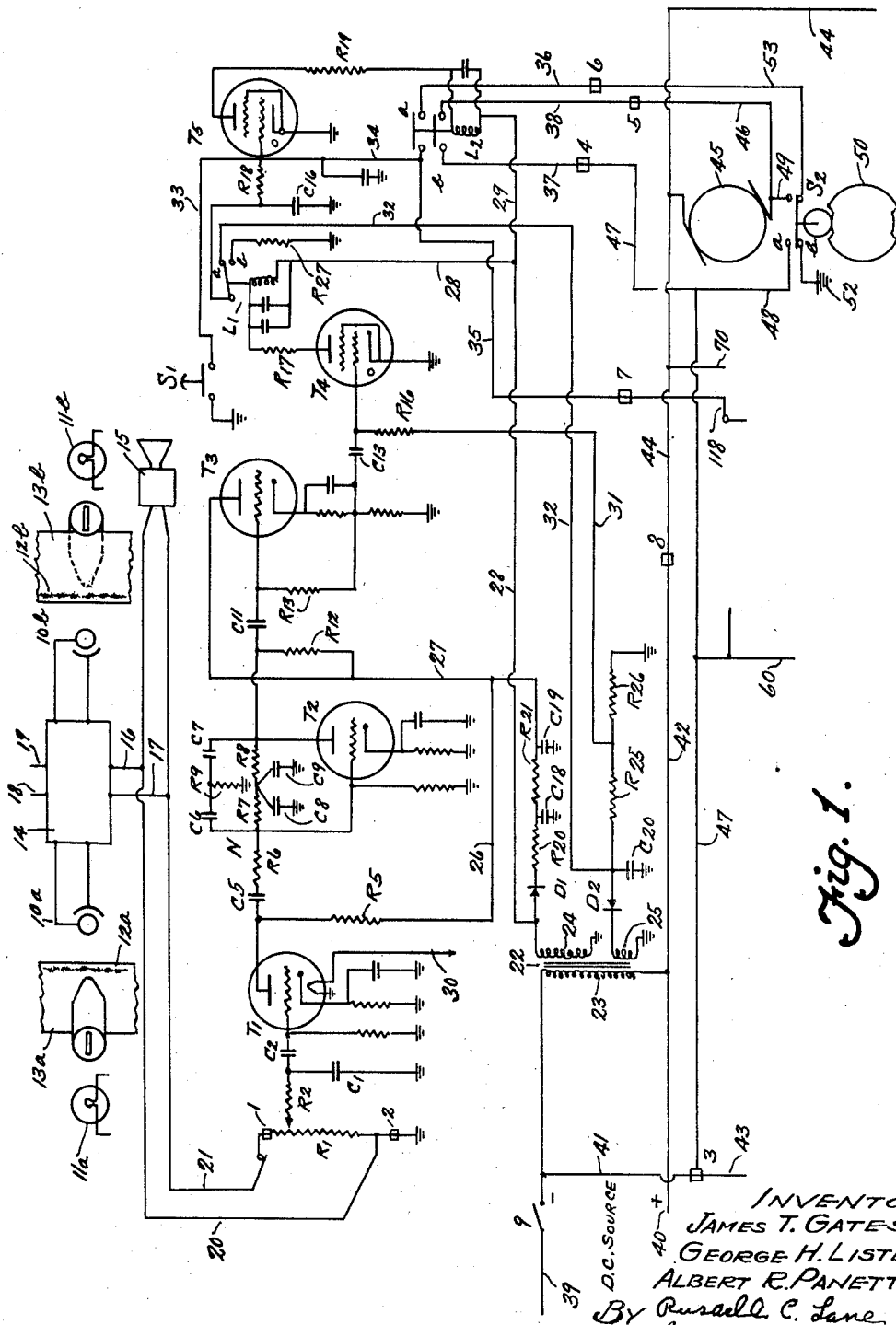
Fig. 1 is a circuit diagram of an initiator circuit adapted to pick off a specific frequency and translate it for the initial energization of a motor control circuit, a part of which is also shown schematically.

Referring specifically to the drawings, reference characters 1 to 8 inclusive refer to separable connections, such as plug and jacks, between the initiator and the circuit controller, powered by a D. C. source of electric current controlled by a master switch 9. Pick-up means 10a and 10b respond to a frequency signal produced by the combination of a light beam from the lamp 11a or 11b and a frequency trace 12a or 12b on a film or other medium 13a or 13b either one to feed an amplifier 14 for audible rendition over the output lines 16 and 17 by a speaker 15. The amplifier gets its power from a suitable source by the lines 18 and 19, while lines 20 and 21 tapping into the amplifier output 16 and 17 connect with plug receptacles 1 and 2 and thereby impress the output of the amplifier 14 upon a potentiometer R1.

By the potentiometer R1 the operating level of the initiating device is adjusted for any given setting of the theater amplifier. The potentiometer R1 is adjusted to the particular amplifier used so that the set level of the unit will give operation to a 45 cycle signal and non-operation for all other frequencies. A resistor R2 and capacitor C1 form a low pass filter that serves as a preliminary filter by preventing frequencies above 45 cycles from passing on to the first tube T1, through the coupling capacitor C2. The tube T1 acts as a limiter and amplifier, since it amplifies all signals received, but only up to a given level, so that there is obtained a gain in the amplification of smaller signals over the amplification of signals of greater intensity. The action of tube T1 is to be thought of as a preliminary sorting device for segregating the 45 cycle signal. In its service as an amplifier, tube T1 increases the utility of the device in that it allows operation from a low level output.

The signals from the output of the limiter-amplifier T1 are fed through the coupling capacitor C5 into a selector comprising the network N and the tube T2, which selector is a degenerative or very low gain amplifier for all but the 45 cycle signals. The network N consists of resistors R6, R7, R8 and R9 along with capacitors C6, C7, C8 and C9, and operating in conjunction with tube T2 forms a frequency sensitive or 45 cycle pass filter. It is tuned to amplify the 45 cycle signal and reject all others. Capacitors C8 and C9 could be combined into a single unit.

The output of the selector is capacitatively coupled by C11 to tube T3, a buffer amplifier serving to isolate the high impedance frequency circuit from the low impedance grid circuit being coupled as a cathode follower to a thyratron tube T4 through the resistance-capacitor coupling C13, R16. The buffer-amplifier output controls the first gas discharge tube T4 through the capacitive coupling C13. Tube T4 is of the thyratron type and under control of tube T3, its firing simultaneously discharges approximately 80 volts D. C. to the relay L1 that has a normally closed contact $a$ and an open contact $b$ with a cooperating armature connected through resistor R18 as the input to the signal grid of a second thyratron T5. When the first gas tube T4 is nonconductive, the relay L1 is closed against contact $a$, and condenser C16 has a full negative charge about (−8 v.) applied to it which it obtains from the rectifier and filter D2, C20. C16 chares almost instantly whenever relay L1 is unenergized closin contact $a$. When built up to a limited voltage the capacitor C16 upon connection to ground through R27, discharges to fire the second thyratron T5. The two seconds required for discharge of the capacitor C16, forestalls firing the second thyratron T5 by overtones or high intensity beats that frequently occur in music, and which may be enough to effect the firing of tube T4. When the relay L1 is energized the normally open contact $b$ is engaged which discharges the capacitor C16 to ground through resistor R27. In two seconds tube T5 will fire and relay L2 will be energized.

Tube T4 is the tube that operates relay L1 whenever the frequency of the input signal is 45 cycles. When tube T4 conducts and relay L1 closes against contact $b$, capacitor C16 which is tied to the grid of tube T5 through resistor R18, is removed from the point of negative voltage and grounded through resistor R27, which permits capacitor C16 to discharge at a rate proportional to CR until the grid bias is reduced sufficiently to allow tube T5 to conduct. Tube T5 fires whenever its grid is connected to ground, and operates the control relay L2 that starts or initiates the operation of the changeover device. The firing of tube T5 may be manually controlled by closing a push button switch S1.

The initiator is powered from a D. C. source, when the switch 9 is closed, by a transformer 22 whose primary 23 induces high potential current in secondary 24 and low potential current in secondary 25 suitable for supply to the various circuit elements of the controller. Current from 24 is rectified by D1 and filtered by resistors R20, R21 and capacitors C18, C19 to provide plate current for tube T1 by conductor 26 and resistor R5, for tube T2 by branch 27 and resistor R12, and for tube T3 by 27 extended. Unrectified plate supply is provided by lead 28 through the winding of relay L1 and load resistor R17 to the plate of tube T4, and a branch 29 leads to the winding of relay L2 and by way of resistor R19 to the plate of tube T5. Current from 25 is rectified by D2 and filtered by capacitor C20 and resistors R25 and R26. The secondary 25 provides low voltage current for the filaments or heaters of the tubes T1 to T5 inclusive, somewhat as indicated by lead 30 to tube T1. Grid bias and cathode potentials are provided for all of the tubes in the conventional manner as shown, and includes the lead 31 connecting to the grid of tube T4 through the resistor R16, as well as a lead 32 connecting to contact point $a$ of relay L1. The signal grid of tube T5 is directly connected with one of the contacts of the manual switch S1 by lead 33, and to one of the contacts $a$ of the relay L2 by lead 34, which has an extension 35 connecting with receptacle 7. The other contact $a$ of L2 connects by lead 36 to receptacle 6. A second set of contacts $b$ on the relay L2 are connected by leads 37 and 38 to receptacles 4 and 5. Power lines 39 and 40 furnishing D. C. to the transformer 23, also branch at 41 and 42 respectively to connect with receptacles 3 and 8 respectively and thus complete the connections for the initiator electrically separable from the motor control unit at the receptacles 3, 4, 5, 6, 7 and 8.

The several circuits of the motor control circuit are shown in full on Fig. 2 of the drawings, and part of which, the upper part of Fig. 2, is also shown at the bottom of Fig. 1. First, as shown in Fig. 1, two D. C. busses are provided, 43 which is connected to the plug of 3 for the negative side, and 44 that is connected to the plug 8 for the positive side, and across which the various circuit elements are connected by means of switches, relays and the like. The principal element of this device is the cam driving motor 45 connected across the positive bus 44 and a lead 46 connected to the plug 5 which in turn connects by lead 38, the two contacts $b$ of relay L2, and thence by lead 37, receptacle and plug 4 and line 47 to the negative plug and receptacle 3 which leads to the minus bus 39 by 41. The line 47 has a branch 48 leading to one of the contacts $a$ of switch S2, and lead 46 has a branch 49 connected to the other contact $a$ of the switch S2. The switch S2 is operated by the cam 50 when driven by the motor 45, and cycles to open switch contacts $b$ and close the contacts $a$ followed by a return to contacts $b$ for each cycle. One of the contacts $b$ is connected to ground at 52, while the other $b$ contact connects by 53 with plug 6 the receptacle of which connects by 36 to contact $a$ of L2. Thus the motor 45 and the cam 50 act as a cycling switch, in that energizing of the motor 45 by the firing of tube T5 and closing of the relay L2, closes a sustaining motor circuit through contacts $a$ of switch S2 until the cam rotates to the next notch and then opens the sustaining circuit. In the meantime other circuits are controlled which complete the sequence specified.

The remaining circuits of the motor control unit may be followed by reference to Fig. 2, where the devices to be operated in relay fashion or in alternate sequence are the two movie projector motors M1 and M2, each associated with a pilot lamp P1 and P2, and an arc lamp A1 and A2 respectively. Each motor and its associated devices are controlled by switches S3 and S4, actuated by cam 51 when rotated by the motor 45. There are other cams all of which are driven by the same motor 45, and include cam 52 that actuates switches S5 and S6 and cam 53 that actuates switches S7 and S8, which switches 55, 56, 57 and 58 control the dousers Z1 and Z2; as well as cam 54 for actuating switches S9 and S10 that control opposed relays L5 and L6 for the changeover devices and locking relays L7 and L8 which in turn control the sound. A greater or lesser number of cams may be driven by the motor 45 for the actuation of additional switches and for control of other devices but the foregoing will suffice to show that several groups of devices may be operated in timed sequence. Specific reference to the switches S3 and S4 with their circuits controlled by the gang switches operated by relays L3 and L4 in conjunction with the manually operated selector switches S11 and S12 will trace the operation of the control device in starting one of the motors M1 and M2 and thence alternately connecting them for operation in repeated sequence.

Each of the relay switches L3 and L4 have four pairs of contacts $a$, $b$, $c$, and $d$ adapted to be bridged by contactors 56 and 58 under control of the relay windings connected in parallel by conductor 60 with the negative line 47 to be connected to the current source by bus 41. The opposite end of the relay windings L3 and L4 is connected in each instance by 62 and 64 to a gang contact $a$ whose opposite contact is connected by 66 and 68 to 70 that joins positive bus 44. Each relay winding is also connected by extensions 72 and 74 to one of the $c$ gang contacts of the other relay, the opposite one of which connects back by 76 and 78 to the associated motor control switch, each with a branch 80 and 82 connecting to one of the $b$ contacts of selector switches S11 and S12 respectively. The other $b$ contact of each of the selector switches joins by leads 84 and 86 the extensions 72 and 74 respectively extending between the coils L3 and L4 and the $c$ contacts of the other gang switch. With respect to each set of gang contacts one of the $b$ contacts connects by lead 88 and 90 respectively to contact $a$ of switch S3 and to contact $b$ of switch S4. A branch 92 joins 88 and a branch 94 joins 90 to connect to the pilot lamps P1 and P2 respectively, both of which are connected to the negative bus 43 by leads 96 and 98 respectively. The other $b$ contact of each pair of gang contacts connects by leads 98 and 100 to motors M1 and M2 and have branches 102 and 104 leading to arc-lamp switches A1 and A2 respectively, and each of which are joined to the negative bus 43 by connections 106, 108, 110 and 112 respectively. The movable element of the switches S3 and S4 are connected to the positive bus 44 by leads 114 and 116.

A conductor 118 extends from the plug connection 7 and connects with one of the $d$ contacts of both gang switches, while the opposite $d$ contact connects by 120 and 122 to one of the $a$ contacts of the selector switches S11 and S12 respectively, with a bridge connection 124 joining 120 and 122. The other $a$ contact of each selector switch is joined by leads 128 and 126 to ground for the grid of tube T5, when switches S11 or S12 and L3$d$ or L4$d$ are closed.

Each of the switches S5 to S10 inclusive are single circuit switches operated by the motor driven cams 52 to 54 inclusive, and have their movable contacts connected to the positive bus 44 by leads 130, 132, 134, 136, 138 and 140, respectively. The fixed contact of switches S5 to S8 are connected by 142, 144, 146, and 148 to the douser controls Z1 and Z2 which in turn are connected in parallel to the negative bus by line 150. The fixed contacts of the switches S9 and S10 connect by 152 and 154 serially with the coils of locking relays L7 and L8 which are joined at 156 to connect with the minus bus 43. Winding $x$ of relay L6 and winding $y$ of relay L5 are connected in parallel across 152 and bus 43 while winding $y$ of relay L6 and winding $x$ of relay L5 are connected in parallel across the bus 43 and connection 154.

The foregoing description of the motor control unit should illustrate that there are two sets of duplicate apparatus, each of which is susceptible of being started at the conclusion of a performance by the other. Each set includes a cycling switch S3 or S4 driven by the motor 45, a conditioning gang switch L3 or L4, and selecting switches S11 or S12, interconnecting projector motors M1 and M2, arc lamps A1 or A2, and pilot lamps P1 or P2 across the buses 43 and 44. Other cycling switches S5 to S10 driven by the cam motor 45 actuate the two douser controls Z1 and Z2, the two changeover relays L5 and L6, and the two locking relays L7 and L8, in proper timed relation.

Whenever the signal grid of the tube T5 is connected to ground, the tube fires, and the relay winding L2 in its plate circuit is energized to actuate the plunger which closes both pairs of contacts $a$ and $b$ of relay L2. Contacts $a$ of L2 establish a direct but temporary connection between the grid of T5 and ground through contacts $b$ of switch S2. Contacts $b$ of L2 establish a temporary starting circuit for the cam driving motor 45 over 47, 37, 38 and 46, across the buses 43 and 44. Rotation of the motor 45 drives the cams 50 to 54, that in turn actuate the switches S2 to S10 to cycle the selected operations. The first action of the cycling switches in the point of time is the operation of cam 50 to open the contacts $b$ and close the contacts $a$ of switch S2 which opens the ground connection for the grid of tube T5 and establishes a running circuit for the motor 45 through 48, contacts $a$ and 49 bridging the buses 47 and 44. Thus the firing of tube T5 need be but of short duration. Establishing of any ground connection for the grid of tube T5 causes it to fire. Grounding of the grid by closing of L1 and $b$ effects a delayed firing of T5 due to the time constant of C16 and R18, but the grounding of the grid by closing of S1 effects substantially instantaneous firing of the tube. Any grounding of lead 34 also effects instantaneous firing of the tube. If contacts $a$ of L2 are closed, the tube T5 will remain conductive so long as switch S2 is closed at the $b$ contacts. The tube will also remain conductive so long as either of the selecting switches S11 or S12 and one of the conditioning switches L3 or L4 remains in the rest position bridging the $d$ contacts. The switches S11 and S12 determine which one of the projector motors M1 or M2 will be first started and run its cycle during a series of operations.

With the parts standing in the relation illustrated and with main switch 9 closed, the motor control circuit would be nonactive except for energization of the pilot light P2 which is connected across the buses through the $b$ contact of switch S4. The circuits for both motors M1 and M2 are open at the $b$ contacts of the respective conditioning switch L3 and L4, and the circuit for motor M1 is further open at the $a$ contact of switch S3. The glowing of pilot light P2 is indicative that motor M2 is operating or would be operating if the conditioning switch L4 were closed at $b$ contacts. Therefore, motor M1 is the motor that normally will start up on the next firing of the tube T5. Tube T5 can be made conductive by grounding its grid, either directly through closing of switch S1, through a specific time delay by the electronic actuation of relay switch L1, or through closing of either of the manual selector switches S11 or S12. Closing of any one of those switches effects the cyclic operation of cam driving motor 45 which drives all of the cams 50 to 54 inclusive through half of a rotation, or 180 degrees. With the motor control circuit in the condition shown in Fig. 2, any firing of the tube T5 effects the cycling of motor 45 without energizing any other motor control circuits than the change of pilot lighting. If switch S1 is closed, then the motor 45 drives cam 51 through a half turn to shift both switches S3 and S4, which energizes pilot light P1 and de-energizes light P2. The conditioning switches L3 and L4, and the selector switches S11 and S12 being open prevents any other circuits for the motors M1 and M2 being completed, and makes it possible to select which one of the sets of motors and mechanisms will be the first to be started in the daily run.

As shown in Fig. 2, closing of either manual switch S11 or S12 grounds the grid of tube T5 through the d contacts of either conditioning switch, and renders the tube momentarily conductive. Relay L2 operates to start cam driving motor 45. Closing of switches S11 or S12 also operates to complete the return circuit for the winding of the associated conditioning switch and thereby selects the motor M1 or M2 that will be started first. As an illustration, closing of S11 completes by its b contacts a circuit from b of S3 by 78, 80, 84 and 72 to the coil of L3, and the armature 56 pulling up opens the d contacts and closes the a, b and c contacts of the conditioning switch L3. The a contacts establish a holding circuit for the coil of L3, the b contacts complete the circuit for motor M1 except for the open contact a of switch S3, while the c contacts establish a branch circuit in parallel with the b contacts of the other selector switch L4. On the other hand, and under the same conditions of Fig. 2, upon closing of S12 no circuits would be completed other than the grounding of the grid in tube T5 through the a contacts of S12 and the d contacts of either L3 or L4. While the contacts b of S12 would be closed to bridge 82 and 86, the line 76 leads to an open contact a at switch S4. In the instance of closing of S11 the motor M1 would start almost immediately or as soon as the cam 51 rotated far enough to actuate switch S3 and close at contact a. In the instance of closing S12 the motor M2 would start only after cam 51 had rotated to the alternate position, one half turn from that shown in Fig. 2, or to such position that switch S4 closes against contact a. Except for the feature of selecting which motor M1 or M2 starts first, the selector switches S11 and S12 play no part in the continued operation of the motor control circuit. Both sets of contacts that they control are accounted for by the conditioning switches L3 and L4. Once the conditioning switches are actuated to the circuit closed condition they establish their own holding circuits, and complete the associated motor circuits except for the switches S3 and S4, which are alternately opened and closed with such designed overlap to effect some simultaneous operation of motors M1 and M2 during the changeover. The selector switches determine which of the pair of apparatus will start first, and then the initiator attends to the successive operation of both in accordance with the signals on the traveling strip or record.

While the embodiment of the present invention as herein disclosed, constitutes a preferred form, it is to be understood that other forms might be adopted.

What is claimed is as follows:

1. In a motor control apparatus for alternately operating each of two motor driven devices in cycles under control of a selected frequency trace actuated by the currently operating motor driven device, initiating means for effecting the start of either motor driven device before the conclusion of operation by a currently operating motor driven device, comprising in combination, means for sorting the selected frequency and limiting the amplification thereof, filter means for passing only the selected frequency after limiting, buffer means for isolating the selected frequency and applying it to following circuits in amplified form, a switching relay circuit controlled by said buffer means and adapted to be energized through degenerative coupling with said buffer, a motor controlling relay circuit including a gas discharge tube for energizing the relay on occurrence of the proper signal evolved from the selected frequency, time delay means connected with the signal grid of said gas discharge tube, and means including said switching relay for connecting said signal grid either with a current source or with ground through said time delay means, whereby equivalent cycles appearing in music as overtones or high intensity beats will not effect firing of the gas discharge tube.

2. In a motor control apparatus for alternately operating each of two motor driven devices in cycles under control of a selected frequency trace actuated by the currently operating motor driven device, initiating means for effecting the start of either motor driven device before the conclusion of operation by a currently operating motor driven device, comprising in combination, electronic means for discrimination of the selected frequency as an actuating impulse free of associated frequencies, a switching relay circuit controlled by said electronic means and having a rest contact connected with a current source and a second contact connected through a resistance to ground, a gas discharge tube having a signal grid connected to the relay and adapted to be connected to either the current source or the grounding resistance, time delay means including said resistance for retarding the firing of said gas discharge tube when the switching relay connects the signal grid with the ground, and a motor control relay energized from the plate of said gas discharge tube.

3. In a motor control apparatus for alternately operating each of two motor driven devices in cycles under control of a selected frequency trace actuated by the currently operating motor driven device, initiating means for effecting the start of either motor driven device before the conclusion of operation by a currently operating motor driven device, comprising in combination, a control motor and cycling switches driven thereby, a control relay for cycling said control motor, an electron tube with circuit means for energizing the control relay, time consuming means for firing said electron tube and including a resistor-capacitor network, an electric energy source for said relay and said electron tube, switching relay means for impressing a low potential current upon the signal grid of said electron tube and to charge the capacitor of said resistor-capacitor network, said switching relay means also being adapted to ground the signal grid of said electron tube through the resistor of said resistor-capacitor network for retarding the firing of said electron tube, high potential means for energizing said switching relay means, and an electronic initiating network for discriminating the selected frequency and for developing from said selected frequency an amplified actuating impulse free from associated frequencies for control of said switching relay.

4. In a control system for successively operating a plurality of photographic projectors, the combination with a plurality of sets of cam operated switches for control of motors, lamps, sound heads and shutters of associated projectors, and a cycling motor for actuating said sets of switches, of an initiating means for control of said cycling motor comprising an electron relay circuit having a gas discharge tube rendered conductive by connecting its signal grid to ground potential, a control relay having its winding in the plate circuit of said gas discharge tube, a switching relay normally maintaining the bias of said signal grid at a potential remote from conductivity, energizing means for said switching relay and operative to connect said signal grid to ground, time consuming means made operative when the switching relay is energized for delaying the return of grid bias to tube conductivity, and electronic means rendered operative by the operation of one projector for translating a selected frequency signal into an actuating impulse isolated from associated frequencies of music and its overtones for starting the grounded discharge of the time consuming means for firing the gas discharge tube.

5. In a control system of the class described, a control source including a variable frequency generating device superimposed with a selected frequency of definite duration, electronic means for separating and isolating the selected frequency and translating it into a control signal of substantial electrical energy enduring for the said definite duration, means for reception of said control signal including a switching relay, a gas discharge tube circuit controlled by said switching relay, means including said switching relay for overbiasing the grid of said discharge tube, means including said switching relay for reducing the bias of said discharge tube to effect firing of the tube incident to duration of the control signal, a switching motor whose energization is controlled by the gas discharge tube, and means actuated by the firing of said gas discharge tube for temporarily completing the reduced bias of said tube in shunt with the reduced bias established by said switching relay.

J. T. GATES.
GEO. H. LISTER.
ALBERT R. PANETTA.

No references cited.